United States Patent Office 3,229,538
Patented Jan. 18, 1966

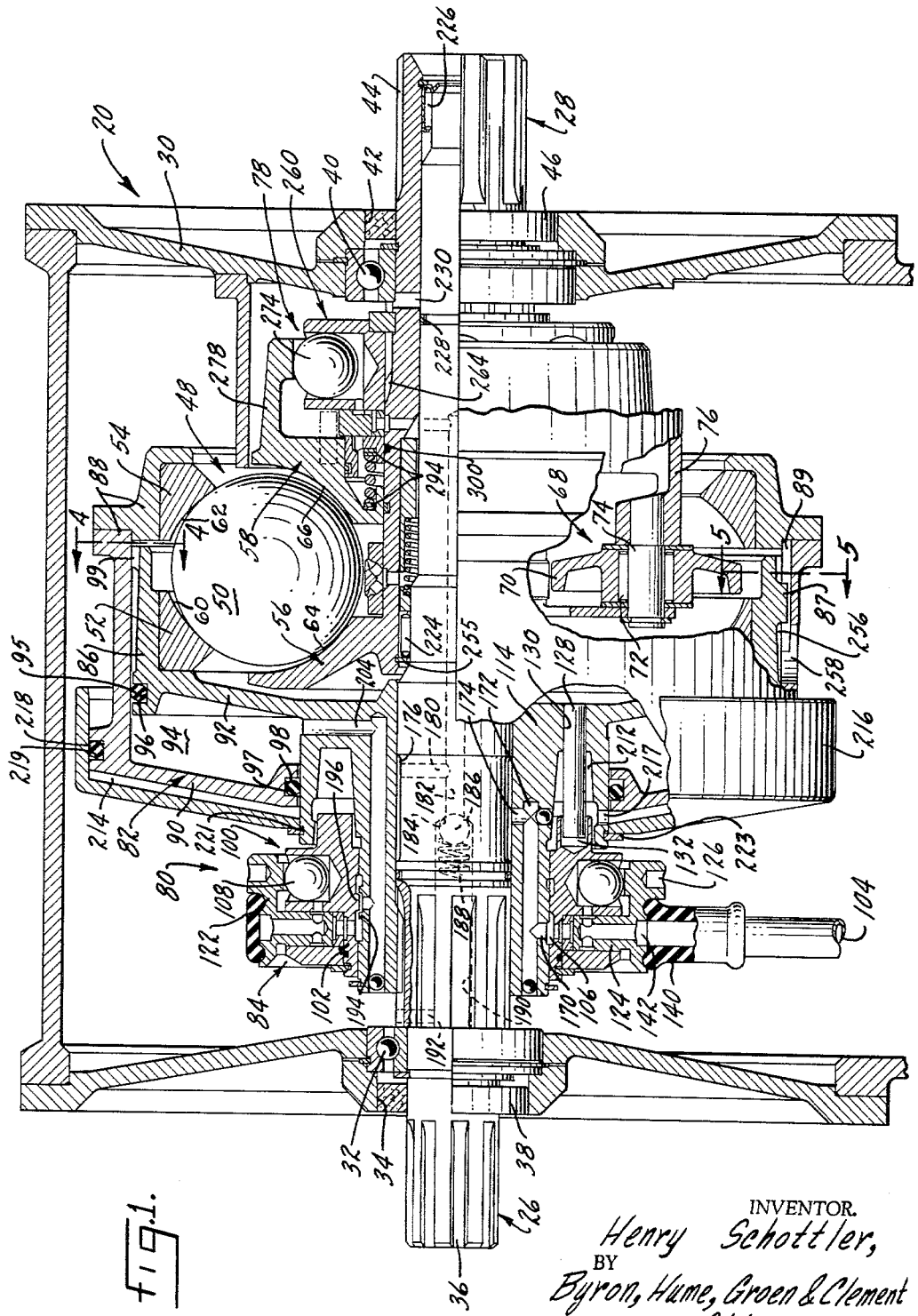

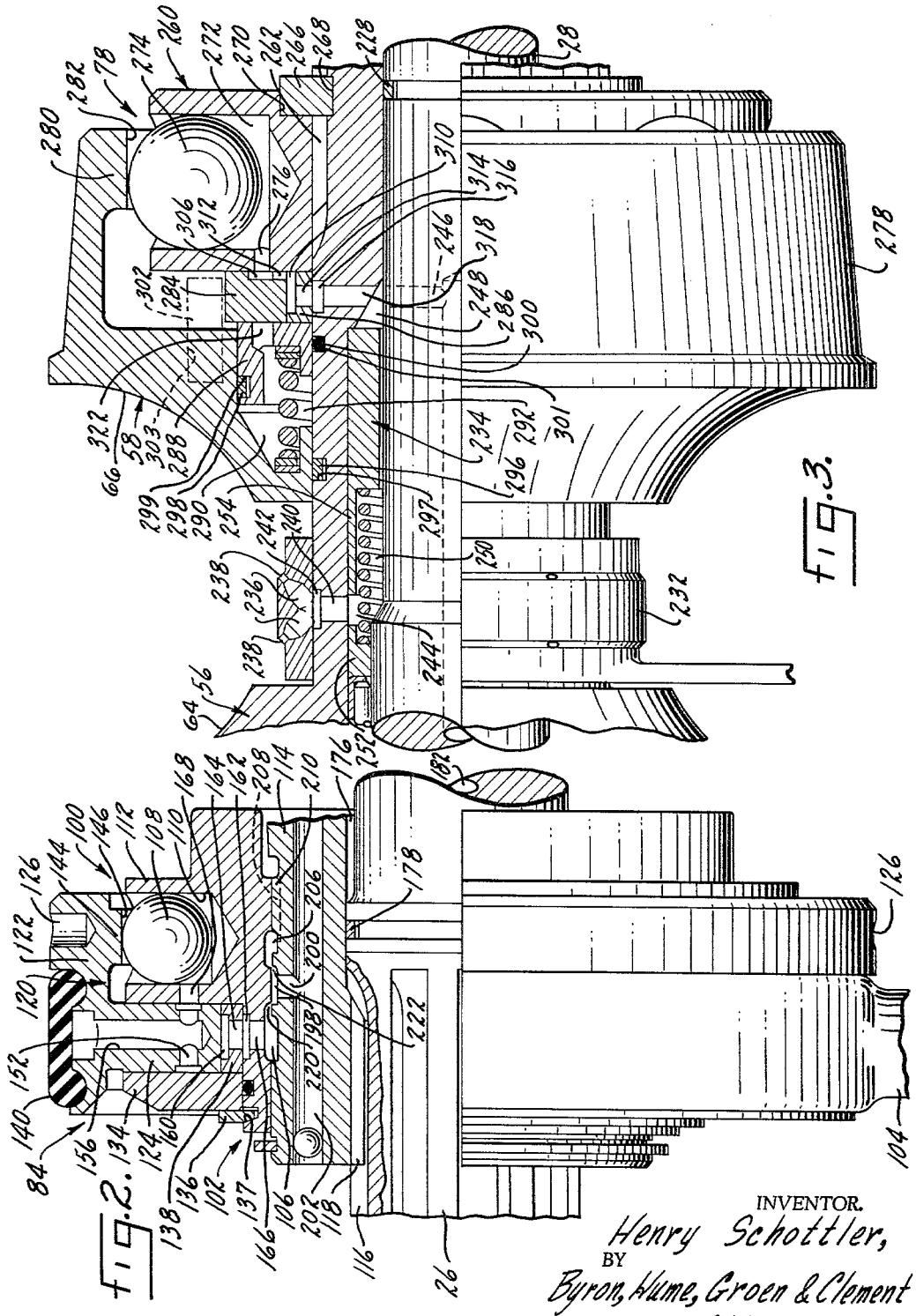

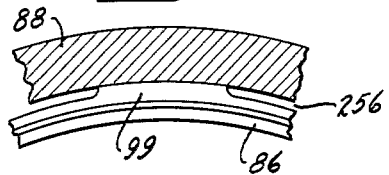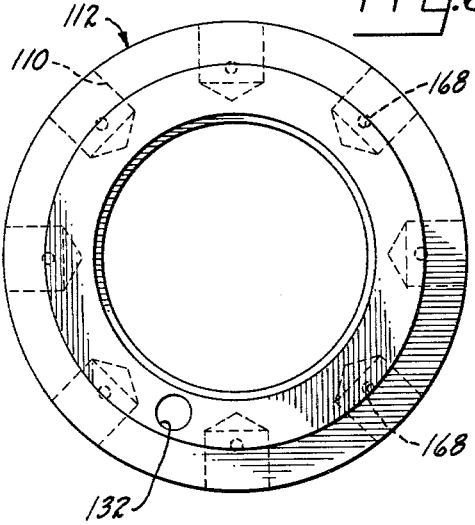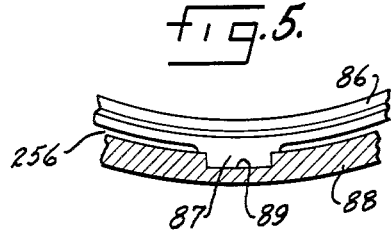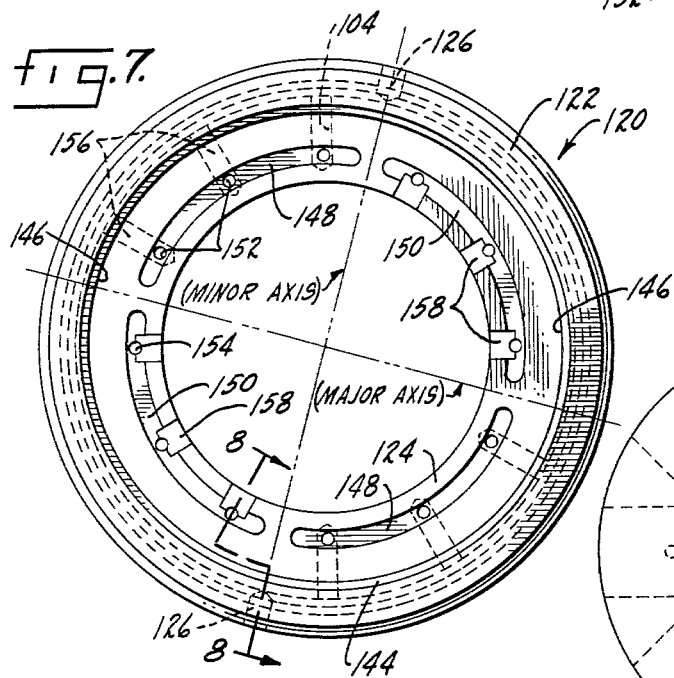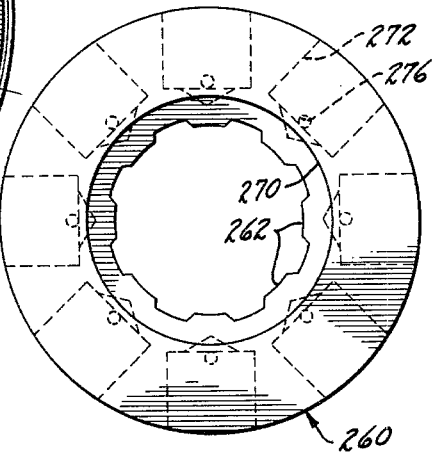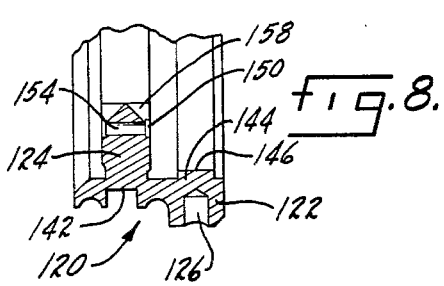

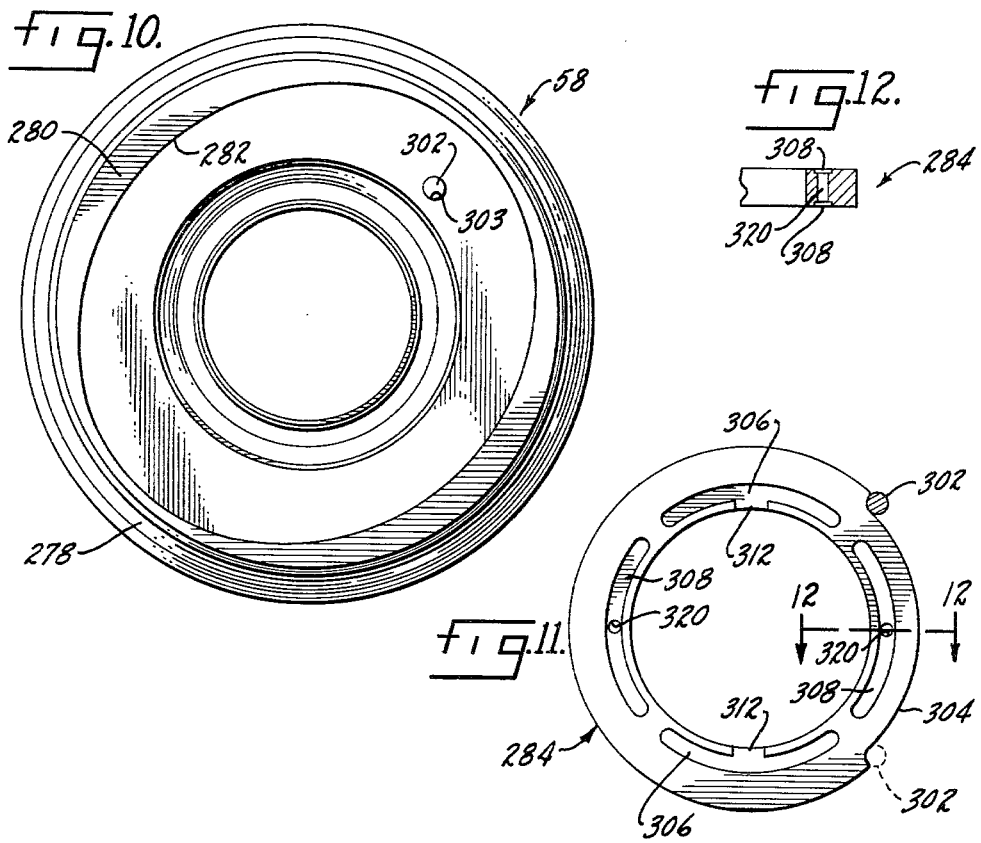

3,229,538
VARIABLE SPEED DRIVE TRANSMISSION
Henry Schottler, North Riverside, Ill., assignor, by mesne assignments, to Roller Gear Ltd., Zug, Zug, Switzerland, a corporation of Switzerland
Filed Sept. 25, 1961, Ser. No. 140,397
21 Claims. (Cl. 74—198)

This invention relates to mechanical type infinitely variable speed drive transmissions. More particularly, the invention relates to an infinitely variable speed frictional drive transmission incorporating drive balls frictionally engaging between inner and outer races.

The invention disclosed herein covers improvements in mechanical infinitely variable speed transmissions of the same general type disclosed and claimed in my copending patent application, Serial No. 29,035, filed May 13, 1960.

It is a general object of the present invention to provide an improved mechanical type infinitely variable speed drive transmission.

Another object of the invention is to provide an improved frictional drive transmission capable of transmitting high torque loads between a drive and driven shaft through a wide range of infinitely variable speed ratios.

A further object of the invention is to provide a frictional drive transmission incorporating improved mechanism for automatically controlling drive pressures between the frictional drive elements.

Still another object of the invention is to provide an improved ball and race type transmission employing minimum drive pressures between the torque transmitting members throughout the range of speed ratios and torques.

An important object of the invention is to provide an improved frictional drive transmission incorporating a dynamic drive pressure regulator.

A still further object of the invention is to provide an improved frictional drive transmission in which the drive pressures between the torque transmitting members are automatically regulated to compensate for changes in friction coefficient between the members.

An additional object of the invention is to provide a ball and race type transmission in which one pair of races is coupled by hydraulic means which generate drive pressures between these races varying with relative rotation of the races.

Another object of the invention is to provide an improved frictional drive transmission in which the drive pressures between the torque transmitting members are regulated to compensate for changes both in frictional coefficient between the torque transmitting members and torque being transmitted through the transmission.

Still another object of the invention is to provide an improved ball and race type transmission incorporating a dynamic drive pressure regulator through which shock torque from the output shaft is transmitted to prevent shock slip.

A further object of the invention is to provide an improved frictional drive transmission in which shock loads are transmitted hydraulically rather than mechanically.

An important object of the invention is to provide an improved ball and race type infinitely variable ratio transmission which can be economically manufactured and easily serviced.

Other objects, features and advantages will be apparent from the following detailed description, taken in conjunction with the accompanying drawings in which:

FIGURE 1 is a longitudinal, partially sectional view of a mechanical infinitely variable speed drive transmission according to the present invention;

FIGURE 2 is an enlarged fragmentary sectional view of the hydraulic control unit portion of the transmission of FIGURE 1;

FIGURE 3 is an enlarged fragmentary sectional view of the dynamic regulator portion of the transmission of FIGURE 1;

FIGURE 4 is a fragmentary sectional view taken along line 4—4 of FIGURE 1;

FIGURE 5 is a fragmentary sectional view taken along line 5—5 of FIGURE 1;

FIGURE 6 is an end elevational view of an internal pump member portion of the hydraulic control unit of the transmission of FIGURE 1;

FIGURE 7 is an end elevational view of an external pump member portion of the hydraulic control unit of the transmission of FIGURE 1;

FIGURE 8 is a fragmentary sectional view taken along line 8—8 of FIGURE 7;

FIGURE 9 is an end elevational view of a cylinder body portion of the dynamic drive pressure regulator of the transmission of FIGURE 1;

FIGURE 10 is an end elevational view of the cam arm portion of one of the inner races of the transmission of FIGURE 1;

FIGURE 11 is an end elevational view of a kidney port plate portion of the dynamic drive pressure regulator of the transmission of FIGURE 1; and FIGURE 12 is a fragmentary sectional view taken along line 12—12 of FIGURE 11.

The frictional drive transmission of this invention is generally designated by the reference numeral 20. This transmission includes an input or drive shaft 26 and an output or driven shaft 28 extending from opposite ends of a suitable stationary casing or housing 30.

The drive shaft 26 is rotatably supported by means of an anti-friction ball bearing unit 32 mounted in an opening 34 through which a splined end 36 of the drive shaft extends. A suitable lubricant seal 38 is mounted in the opening 34 outwardly of the ball bearing 32. The driven shaft 28 is rotatably mounted by means of an anti-friction ball bearing unit 40 disposed in an opening 42 in the other end of the housing 30 and through which a splined end portion 44 of the driven shaft extends. A suitable lubricant seal 46 is mounted in the opening 42 outwardly of the anti-friction bearing 40.

It should be noted that the spaced ball bearings 32 and 40 are the only required supports for the rotating portion of the transmission 20. Thrust bearings are not required in either of these locations since all thrust forces are self-contained.

FRICTIONAL DRIVE MECHANISM

The drive shaft 26 is connected for driving the driven shaft 28 through frictional drive mechanism 48, covering a speed range from zero output speed to approximately 2.5 overdrive with respect to input speed. The frictional drive mechanism 48 is of the ball and race type and includes three hardened spherical drive balls 50 disposed in annularly spaced relation in an annulus formed between a pair of outer ball bearing races 52 and 54 and a pair of inner ball bearing races 56 and 58. The outer races 52 and 54 are provided with respective hardened raceway surfaces 60 and 62, and the inner races 56 and 58 are provided with respective hardened raceway surfaces 64 and 66. The curvatures of the respective raceway surfaces are preferably formed in accordance with the concepts of applicant's prior patent application, Serial No. 852,902, filed November 13, 1959 (continuation of Serial No. 536,231, filed September 23, 1955, now abandoned). The balls 50 and races 52, 54, 56 and 58 are referred to collectively as frictional drive elements or torque transmitting members.

The drive balls 50 are prevented from planetating through a reaction member generally designated by the reference numeral 68. The reaction member 68 comprises three reaction rollers 70 equally spaced between the three drive balls 50 and mounted for rotation by means of anti-friction roller bearings 72 on axle members 74 which, in turn, are carried by a stationary spider member 76 which is fixedly attached to the stationary casing 30.

The various portions of the frictional drive mechanism 48 are formed of tough, hard materials, such as suitably hardened high-grade steel.

According to the present invention, proper drive pressures for substantially positive, non-slip drive between the torque transmitting members are automatically achieved through a hydraulic-type dynamic drive pressure regulator device generally designated by the reference numeral 78. Subsequently, it will be explained in detail how drive pressures exerted through the dynamic regulator 78 are not only proportional to torque being transmitted but also increase automatically with decreased friction to compensate for changes in the coefficient of friction between the drive balls and the races.

The outer races 52 and 54 are axially shiftably disposed relative to one another and are connected for being directly driven by the drive shaft 26, in a manner to be described in detail. The inner race 56 is fixedly connected in direct drive relationship to the driven shaft 28, and the inner race 58 is coupled to the inner race 56 through the dynamic regulator 78. Accordingly, the outer races constitute the input members and the inner races constitute the output members of the frictional drive mechanism 48.

RATIO CHANGING MECHANISM

Changes in drive ratio between the drive and driven shafts are achieved through a hydraulic ratio changing mechanism generally designated by the reference numeral 80. As described in detail in applicant's prior applications referred to above, higher speed ratio drives are achieved by pressing the outer races 52 and 54 toward one another to move the drive balls 50 radially inwardly, spreading the inner races 56 and 58. Low speed ratio drives are achieved by pressing the inner races toward one another and spreading the outer races to move the drive balls radially outwardly. In the particular configuration illustrated with the input shaft 26 rotating at 1,750 r.p.m., for example, the output shaft 28 will rotate at 4,500 r.p.m. when the drive balls 50 are in their radially inwardmost positions as illustrated in FIGURE 1. With the drive balls moved to their radially outwardmost positions so that they spin about their own axes parallel to the axis of the transmission 20, the driven shaft 28 will remain stationary as the drive shaft is rotated. An infinite number of intermediate drive ratios can be achieved at intermediate radial positions of the drive balls 50. It will be seen that throughout the ratio range the driven shaft will rotate in a reverse direction from the direction of rotation of the drive shaft.

The hydraulic ratio changing mechanism 80 includes a hydraulic ratio changing servo 82 for controlling the relative axial positions of the outer races 52 and 54 in response to hydraulic pressure supplied through a hydraulic control unit 84.

The outer race 52 is fixedly secured to an annular race carrying member 86, and the outer race 54 is fixedly secured to another outer race carrying member 88. The race carrying members 86 and 88 are axially shiftably coupled for concurrent rotation in any suitable manner, for example, through a plurality of circumferentially spaced integral lugs 87 (FIGS. 1 and 5) formed on the race carrying member 86 and shiftably disposed in corresponding axial grooves 89 formed in the race carrying member 88. The race carrying member 88 overlies the race carrying member 86, and integral axially spaced webs 90 and 92 of the respective race carrying members define a hydraulic pressure chamber 94 of the control servo 82. An O-ring 95 carried in an annular groove 96 of the race carrying member 86, and an O-ring 97 carried in an annular groove 98 of the race carrying member 88 provide the necessary hydraulic seals between the two race carrying members to prevent leakage from the pressure chamber 94.

In order to radially center the two race carrying members 86 and 88 and the two outer races 52 and 54, the race carrying member 86 is provided with a plurality of integral lugs 99 (FIGS. 1 and 4), which bear against the inner surface of the race carrying member 88 at circumferentially spaced positions. The lugs 87 and 99 are alternately circumferentially spaced.

HYDRAULIC CONTROL UNIT

The hydraulic control unit 84 (FIGS. 1 and 2) includes a hydraulic pump portion 100 acting in conjunction with a balanced control valve portion 102. In general, the pump 100 draws hydraulic fluid from a sump or other supply (not shown) through an inlet conduit 104 and delivers hydraulic fluid under pressure to a pump pressure chamber 106 of the control valve 102.

The control pump 100 is of the ball piston type in which a plurality of spherical ball pistons 108 are reciprocably disposed in complementary cylinders 110 formed in an internal pump member 112. The pump member 112 is axially shiftably disposed on an integral hub portion 114 of the outer race carrying member 86. The hub portion 114 is in turn axially shiftably carried on a portion of the drive shaft 26. Respective mating splines 116 of the drive shaft and 118 of the hub portion couple the parts for concurrent rotation.

Portions of the internal pump member 112 and the hub portion 114 comprise the balanced control valve 102.

An external pump member 120 of the control pump 100 surrounds the internal pump member 112. This outer pump member 120 includes a control ring portion 122 and an integral kidney port portion 124. The control ring 122 is provided with a pair of oppositely disposed bores 126 for receiving portions of a shifter fork (not shown) which is adapted to shift the control ring axially to any desired position between the two extreme control positions indicated. The indicated control positions represent the centerline of the shifter fork bores 126 at zero speed ratio and at 2.5 overdrive speed ratio of the transmission 20, with the parts being shown in the 2.5 overdrive position.

The position of the shifter fork can be controlled in any suitable manner, manually or automatically. The position of the shifter fork, and accordingly, the speed ratio of the transmission, might be controlled by a dial knob, for example, inasmuch as there is no thrust force on the hydraulic control unit in any speed ratio position. To control the shifter fork position automatically, an automatic control system, such as illustrated and described in my prior application Serial No. 29,035, might be employed to control the speed ratio in accordance with vehicle speed and throttle or accelerator position.

The internal pump member 112 of the hydraulic control 84 is axially shiftably disposed on the hub portion 114 of the outer race carrying member 86, but the two members are coupled for concurrent rotation through a drive pin 128 fixedly secured in a bore 130 formed in the hub portion 114. The drive pin 128 has one end portion extending with sliding clearance into a blind bore 132 formed in the internal pump member 112.

Although the internal pump member 112 rotates with the outer races, the external pump member 120 is prevented from rotating by the shifter fork (not shown) which engages in the oppositely disposed blind bores 126.

In order to maintain the kidney port portion 124 of the external pump member 120 in sliding relation against the opposed surface of the internal pump member 112, an annular plate 134 is disposed against the opposite surface of the kidney port portion. A wedge type snap ring 136 is disposed in a wedge-shaped groove 137 formed at the left end portion of the internal pump member 112 in order to retain the annular plate 134 and to press it against the kidney port portion 124.

An annular spacer 138 is mounted on the hub portion of the internal pump member 112 between the annular plate 134 and the main body of the pump member 112. The width of the annular spacer 138 is slightly greater than the width of the kidney port portion 124. When the annular plate 134 is tightly clamped against the spacer 138 through action of the bevelled snap-ring 136, the spacer maintains a sliding clearance of the kidney port portion 134 in order to permit the internal pump member 112 to rotate and the external pump member 120 to be held stationary without undue friction between the parts.

The inlet conduit 104 connects with a resilient inlet ring member 140 formed of rubber, relatively soft plastic, or the like. The inlet ring 140 is tightly fitted about the outer periphery of the outer pump member 120 and surrounds an annular outwardly facing inlet groove 142 formed in the outer pump member. The inlet conduit 104 feeds hydraulic fluid to the inlet groove 142 as shown.

The control ring portion 122 of the outer pump member 120 is provided with an internal annular cam 144 having an annular cam surface 146 which bears against the radially outwardly facing portions of the ball pistons 108. The cam surface 146 is oval shaped, or elliptical, having its major axis generally horizontal and its minor axis generally vertical, as shown in FIGURE 7. Accordingly, the maximum rise of the cam 144 is achieved at two opposed positions near the vertical axis.

As the internal pump member 112 is rotated the cam surface 146 causes the ball pistons 108 to reciprocate in the cylinders 110 in such a manner that they reach top dead center on their inlet strokes at opposed positions near the horizontal axis, and bottom dead center on their compression strokes at opposed positions near the vertical axis. By reason of this construction, forces on the ball pistons 108 are always equal and opposite in pairs so that there is never any eccentric load imposed on the inner pump member 112 or the outer pumping member 120.

To co-ordinate with the pumping action of the ball pistons 108, the kidney port portion 124 of the external pump member 120 is provided with a pair of opposed inlet kidney grooves 148, and a pair of opposed outlet kidney grooves 150. These grooves are duplicated on opposite sides of the kidney port portion, which may also be referred to as a kidney port plate. The inlet kidney grooves on opposite sides of the kidney port plate are connected by a plurality of passages 152. The outlet kidney port grooves on opposite sides of the plate are connected by a plurality of passages 154. Respective radial passages 156 connect the inlet passages 152 with the inlet annular groove 142. The outlet passages 154 are connected by perspective outlet notches 158 with an annular groove 160 formed about the outer surface of the spacer 138. The annular groove 160 is connected by means of a plurality of radial ports 164 with an annular groove 162 formed in the surface of the hub portion of the internal pump member 112 immediately radially inwardly of the spacer 138. The annular groove 162 is connected by means of a plurality of radial ports 166 with the pump pressure chamber 106 formed between the internal pump member 112 and the hub portion 114 of the outer race carrying member 86. Accordingly, the outlet kidney grooves 150 are in constant communication with the pump pressure chamber 106.

Each of the cylinders 110 is provided with a cylinder port 168 in positions radially matching the circle of inlet and outlet kidney ports 148 and 150, respectively. The arrangement is such that the cam 144 forces the ball pistons 108 inwardly on their compression strokes as the respective cylinder ports 168 communicate with the outlet kidney grooves 150. The cam permits the ball pistons 108 to be moved outwardly in response to centrifugal force on their inlet strokes as cylinder ports 168 communicate with the inlet kidney grooves 148.

It is will be seen that the cam 144 is provided with a very low rise in order to accommodate a fairly high relative speed of rotation between the internal pump member 112 and the external pump member 120, inasmuch as the external pump member is stationary while the internal pump member rotates with input speed corresponding to the speed of the output shaft of the driving motor (not shown). Accordingly, the strokes of the ball pistons 108 are very small, and the torque of the pump 100 is correspondingly small.

The pump pressure chamber 106 is connected by means of a radial passage 170 with an axial passage 172 formed in the hub portion 114. The axial passage 172 is connected in turn by a radial passage 174 with an annular groove 176 formed about the input shaft 26. Leakage from this groove is prevented by a piston ring type seal 178 on the left side, and by a very close sliding fit between the shaft and the hub of the member 86 on the right side. This close tolerance fit and the close tolerance fit between the splines 118 and 116 provide the necessary stability for the outer race carrying member 86.

The annular groove 176 formed about the input shaft communicates by means of radial passage 180 with an internal bore 182 formed along the axis of the input shaft. An annular valve seat 184 is formed in the axial bore 182 to the left of the radial passage 180 and a ball check valve 186 is resilient pressed against the valve seat 184 by means of a suitable compression spring 188 disposed in an enlarged bore portion 190. The bore 190 is connected by means of one or more drain passages 192 with the interior of the transmission casing 30, and accordingly with the sump (not shown) at the bottom of the casing. To the left of the drain passages 192 the bore 190 is plugged in any suitable manner (not shown).

The compression of the valve spring 188 and the exposed area of the valve are adjusted so that the valve will act as a pressure relief valve at some predetermined maximum pump pressure, 150 p.s.i. for example, so that when this pressure is reached in the pump pressure chamber 106 and the input shaft bore 182, the ball check valve 186 will move off of the seat bore 182, the ball check valve 186 will move off of the seat 184 to bypass oil through the drain ports 192 and the bore 190 back to the casing and sump. At any pressures below 150 p.s.i. the ball check valve 186 will remain seated to prevent bypass to the sump.

The balanced valve 102 includes an annular land 194 formed on the hub portion 114 immediately to the right of the pump pressure chamber 106 and a corresponding but shorter annular land 196 overlying the land 194. A flat or indentation is formed in the center of the land 194 at a localized position in the periphery to form a control pressure chamber 198. The control chamber 198 communicates by means of a radial passage 200 with an axial passage 202 formed in the hub portion 114. The passage 202 communicates with the servo pressure chamber 94 by means of a radial passage 204. Accordingly, the pressure in the servo chamber 94 always corresponds to the pressure in the control chamber 198.

To the right of the annular land 194, the hub member 114 is formed with an annular relief groove 206 which communicates by means of a plurality of grooves or flats 208 through an annular support land 210 with an annular chamber 212 formed in the hub member 114. Substantial clearance is provided between the internal pump member 112 and portions of the hub member 114 defining the annular chamber 212 so that hydraulic fluid may flow freely back into the casing 30 and back to the sump. It will thus be seen that pressure in the relief groove 206 always corresponds substantially to casing pressure.

CENTRIFUGAL BALANCE CHAMBER

In order to counteract the centrifugally induced head or pressure in the servo chamber 94 as the transmission is rotated, a centrifugal balance chamber 214 is provided to the left of the web 90 by means of a bell member 216 which surrounds the left end portion of the outer race carrying member 88. Hydraulic fluid is supplied to the balance chamber 214 through a plurality of radial passages 217 which communicate between the balance chamber and the annular chamber 212. An O-ring 218 is disposed in an annular groove 219 formed in a portion of the outer race carrying member 88 adjacent the bell member 216 to provide a fluid seal. The bell member 216 is retained in place by means of a snap-ring 223 disposed in a mating groove 221 formed in the hub member 114 adjacent the inner periphery of the bell member. It will be seen that the effective diameter of the centrifugal balance chamber 214 is greater than the effective diameter of the control pressure chamber 94, so that a slight centrifugal unbalance will occur tending to move the outer race carrying member 88 to the right, thus tending to separate the outer races 52 and 54 whenever the pressure in the servo chamber 94 is relieved or reduced to a very low value.

RATIO CHANGING

It will be seen that the balanced control valve 102 is quite similar in principle to the balanced control valves disclosed in my prior application Serial No. 29,035, referred to above. Pressure in the control chamber 198, and consequently in the passages 202 and 204 and in the outer race servo chamber 94, is controlled by the position of the land 196 with respect to the land 194. The relative positions of these lands control the relative size of a pressure control port 220 formed at the left edge of the land 196 and the corresponding edge of the control chamber 198, and a relief or drain control port 222 formed at the right edge of the land 196 and the adjacent edge of the control chamber.

Movement of the control land 196 toward the right increases the opening of the pressure control port 220 and decreases the opening of the relief control port 222, thereby increasing the pressure in the outer race servo chamber 94. This causes the outer races to be pressed together moving the land 194 of the hub portion 114 to the right until the control pressure port is reduced in size sufficiently to cause the pressure in the servo chamber 94 to be just sufficient to maintain the outer races 52 and 54 in a state of axial equilibrium.

Accordingly, movement of the hydraulic control 84 toward the right causes the outer races 52 and 54 to be pressed closer together which moves the drive balls 50 radially inwardly to increase the speed ratio through the transmission. Conversely, movement of the hydraulic control 84 to the left causes the outer races to be moved axially away from one another to decrease the speed ratio through the transmission.

The greater the torque being carried through the transmission, the greater is the pressure required in the servo chamber 94 in order to maintain the outer races in the axial position predetermined by the positioning of the hydraulic control 84. Accordingly, the pressure in the chamber 94 varies directly as the torque being transmitted through the transmission. The normal range of pressure encountered in the servo chamber 94 varies, for example, between 10 and 40 p.s.i.

The pump outlet pressure, which is the pressure in the pump pressure chamber 106, is also normally responsive to torque being carried through the transmission. Ordinarily, this pump outlet pressure is only a few p.s.i. higher than the control pressure in the chamber 198. However, upon movement of the control ring 122 to decrease the speed ratio, the control port 220 is momentarily restricted or closed off and the pump outlet pressure is instantly increased to a high value, often to the maximum pressure of 150 p.s.i. where the relief valve 184 opens to prevent further increase. Conversely, when the control ring is moved in the speed ratio increasing direction, the relief port 222 is momentarily restricted or closed so that the pump outlet pressure and the control pressure are substantially equal until equilibrium is again reached. In both instances equilibrium is ordinarily re-established in a matter of a second, or a few seconds at most, so that the normal pressure differential is again achieved.

OUTPUT SHAFT MOUNTING

The output shaft 28 and the integral inner race 56 are rotatably mounted on the input shaft 26 by means of axially spaced anti-friction roller bearings 224 and 226. The roller bearings 224 are disposed radially inwardly of the inner race 56 and the roller bearings 226 are disposed between the right end portion of the output shaft and the end of the input shaft. Substantial working clearance is provided between the shafts, and accordingly a piston ring type seal 228 is disposed in a groove formed in the input shaft to prevent leakage toward the right between the shafts. Immediately to the right of the piston ring 228, a drain port 230 is formed through the output shaft just inwardly of the anti-friction ball bearing 40.

DRIVE MEMBER COOLING AND LUBRICATION

A substantially constant lubricating and cooling flow of hydraulic fluid is sprayed in a predetermined manner against each of the drive balls 50 by means of a stationary nozzle member 232 acting in conjunction with a pressure regulating valve 234. The nozzle member 232 is journalled on the output shaft 28 immediately to the right of the inner race 56, and the nozzle member is anchored to the reaction member 68 in any suitable manner as shown. Radially inwardly of each of the drive balls 50, the nozzle member 232 is provided with a pair of nozzles 236 having respective nozzle orifices 238 which direct identical streams of hydraulic fluid in generally opposite directions against the lower surface of each ball in the direction of the opposed inner races 56 and 58.

Hydraulic fluid is supplied to the nozzles 236 through one or more radial passages 240 which communicate between an annular external groove 242 formed in the output shaft immediately radially inwordly of the nozzles and an annular regulating chamber 244 formed between the input and output shafts. The regulating valve 234 is axially shiftably disposed in the regulating chamber 244. Immediately to the right of the regulator valve 234 pump outlet pressure is supplied through a radial passage or passages 246 from the axial bore 182 in the input shaft 26 to an annular pressure chamber 248. An annular clearance is provided between the inner surface of the regulator valve 234 and the adjacent surface of the input shaft to provide a path for limited flow of hydraulic fluid. A compression spring 250 is disposed between the valve 234 and a spring seat member 252. An annular integral skirt 254 is formed as the left portion of the valve 234. The spring seat member 252 and the valve member 234 rotate with the driven shaft 28, and the spring seat member positions the roller bearing 224 against a snap ring 255 carried in a groove formed in the driven shaft.

Pump pressure in the annular pressure chamber 248 biases the regulator valve 234 toward the left against the bias of the spring 250 tending to close off the passages 240. Closing of the passages 240 increases the pressure in the chamber 244 which acts against the left end of the regulator valve biasing the regulator valve back toward the open position along with the compression of the spring 250. The arrangement is such that a substantially constant equilibrium pressure is achieved and provided in the nozzles 236. It is contemplated, for example, that a constant pressure of from 5 to 10 p.s.i. will be maintained in the nozzles 236. Since the pressure in the nozzles is substantially constant, the flow through the nozzle orifices 238 will vary only with change in viscosity. Higher viscosity, and accordingly lower flow, is ordinarily indicative of lower hydraulic fluid temperature and greater lubricity. Under such conditions less flow is required. Conversely, at higher temperatures and lower viscosity, greater flow will be achieved for increased cooling and increased lubrication.

The nozzles 236 are so disposed below the drive balls 50 that the hydraulic fluid does not flow directly to the points of contact between the drive balls and the inner races 56 and 58. Although the hydraulic fluid is sprayed directly radially inwardly of each of the drive balls, it should be remembered that the balls are rotating, and this causes the main flow of lubricant to bypass the points of drive contact. Some small portion of the lubricating oil will reach and lubricate the points of drive contact, but the main portion of the flow will bypass these contact points. The flow is utilized primarily for cooling purposes. The relationship between cooling flow and lubricating flow can be adjusted by adjusting the circumferential position of the nozzle member 232 which adjusts the positions of the lubricating nozzles 236 with respect to the drive balls 50.

The lubricant and cooling flow thrown radially outwardly by centrifugal force from the inner races, the drive balls and the outer races flows between the two outer race carrying members 86 and 88 through an annular clearance 256 and out one or more outlet ports 258 formed through the outer periphery of the outer race carrying member 88. Accordingly, the fluid is directed into the casing 30 and back to the sump. In some instances, an oil cooler (not shown) may be utilized to cool the hydraulic oil before it is fed back into the transmission system through the inlet conduit 104.

DYNAMIC DRIVE PRESSURE REGULATORS

According to the invention, mechanical drive pressures between the drive balls 50 and the inner races 56 and 58, and, accordingly, mechanical drive pressures between the drive balls and the outer races 52 and 54, are automatically adjusted through the dynamic drive pressure regulator 78 (FIGS. 1 and 3) in order to reduce the drive pressures to the lowest possible value while still achieving substantially positive, non-slip drive for all conditions. Essentially, the dynamic regulator 78 is a hydraulic pump which hydraulically couples the inner race 58 to the inner race 56 and to the output shaft 28 in order to provide the exact mechanical drive pressure required for essentially non-slip drive under all conditions. Generally speaking, the inner race 56 is coupled to one portion of the pump and the inner race 58 is coupled to the other portion of the pump, so that the inner race 58 is permitted to slightly overrun the inner race 56. The amount of drive pressure exerted depends upon the amount of overrunning of the race 58 with respect to the race 56. The dynamic regulator also automatically takes into account the amount of torque being transmitted by the transmission and adjusts the drive pressures accordingly.

It should be understood that due to elastic deformation of balls and races, a certain amount of creep always occurs even in ball bearings which have no tangential forces applied. The creeping action increases when tangential forces are applied between the balls and races. Therefore, friction drives can never be absolutely positive but it is desirable that they be very close for high efficiencies.

Increased positiveness in frictional drives requires reduction in the ratio of tangential force between a ball and race at the point of contact and axial force (or drive pressure) between the ball and race at the point of contact.

In order to increase the positiveness of the drive in a frictional drive mechanism, the pressure ratio must be decreased. This means that the pressures at points of contact between the frictional drive elements are increased resulting in higher surface stress and lower life. Accordingly, in order to obtain maximum transmission life, it is necessary to allow a certain small percentage of creep or slip. Through the dynamic regulator of this invention, this required creep is put to work, so to speak, to balance the drive pressure between the balls and races with the coefficient of friction to automatically achieve the lowest possible drive pressure required in every drive condition.

The dynamic regulator 78 includes a cylinder body 260 which is coupled for concurrent rotation with the driven shaft 28 by means of respective mating splines 262 and 264 formed on the cylinder body 260 and on the output shaft. The cylinder body is positively positioned axially by means of a heavy split ring 266 mounted in a close fitting radial groove 268 on the output shaft and engaged in a notch 270 formed in the radially inwardly right hand margin of the cylinder member. As will be seen, all thrust forces of the inner races 56 and 58 are carried by the split ring 266 so that no thrust forces are imposed on the anti-friction bearings 32 and 40.

The cylinder body 260 is provided with a plurality of radially extending, equally spaced pumping cylinders 272, each containing a closely fitted ball piston 274. A cylinder port 276 extends through the left wall of each of the cylinders. An integral cam arm 278 of the inner race 58 contains at its end a generally circular, ring type cam 280 having an annular internal cam surface 282 engaging the ball pistons 274. The cam surface 282 is generally oval in configuration having a shape like an ellipse with the highest rise portions of the cam falling along the minor axis of the ellipse and the lowest rise portions of the cam lying along the major axis of the ellipse. Accordingly, in a manner similar to that of the pump 100, forces within the dynamic regulator are always equally balanced inasmuch as the ball pistons are distributed in opposite pairs carrying equal and opposite loads.

Since the relative speed of rotation between the cam 280 and the cylinder body 260 depends upon the slight speed differential between the respective inner races 58 and 56, a relatively high rise cam is utilized to achieve a relatively long stroke of the ball pistons 274. In a typical embodiment, for example, the maximum differential rotation between the inner races does not ordinarily exceed about 2%. Accordingly, the relative speed of rotation in the dynamic regulator 78 never exceeds about 90 r.p.m. and is ordinarily substantially less.

A kidney port plate 284 abuts the cylinder body 260 immediately to the left. The kidney port plate overlies an annular spacer 286 which is carried on the output shaft 28. A pressure port member 288 is disposed in a dynamic pressure chamber 290 formed in the radially inward peripheral portion of the inner race 58 immediately to the left of the kidney port member 284 and the spacer 286. The spacer 286 is slightly wider than the kidney port plate 284 to permit clamping of the spacer between the cylinder body 260 and the pressure port member 288 while still permitting relative rotation of the kidney port plate without undue friction.

A compression spring 292 is disposed in the dynamic pressure chamber 290 and acts between the inner race 58 and the pressure port member 288 tending to press the pressure port member, through the spacer 286 and the cylinder body 260, against the thrust carrying split ring 266. The spring thus provides a resilient preload urging the two inner races 56 and 58 toward one another. Thrust washers 294 are disposed between the opposite ends of the preload spring 292 and the respective inner race 58 and pressure port member 288 in order to accommodate the relative rotation between these members. Since the speed of relative rotation is quite small, no other bearings are required.

It will be seen that the preload spring 292 biases the frictional drive mechanism toward minimum speed ratio and also holds the frictional drive elements in initial frictional drive engagement for start.

Since relative rotation is contemplated between the inner race 58 and the output shaft 28, a piston ring type seal 296 is disposed between the members in a groove 297 in the output shaft. For the same reason a piston ring type seal 298 is disposed between the pressure port member 288 and the inner race 58 in a groove 299 formed in the outer periphery of the pressure port member. Since there is no relative rotation between the pressure port member and the output shaft, a standard O-ring seal 300 is disposed between these members in a groove 301 formed in the output shaft.

The kidney port plate 284 is coupled for concurrent rotation with the inner race 58 by means of a pin 302 pressed in a blind hole 303 formed in the inner race and carried in a slot 304 formed in the outer periphery of the kidney port plate. The slot 304 extends peripherally for approximately 90° for a purpose to be described. During the usual forward torque condition when the drive shaft 26 is driving the driven shaft 28, the pin 302 is disposed at one end of the slot 304 as shown in solid lines in FIGURE 11 in order to maintain the kidney port plate in a predetermined relation with the cam surface 282. In FIGURE 1 the pin 302 is illustrated in phantom lines since it will be understood that the pin is actually displaced about 45° from the position shown with the parts located as shown in FIGURE 1. From FIGURE 10 it will be seen that the pin 302 is located adjacent one low rise portion of the cam.

The kidney port plate 284 is provided with an oppositely disposed pair of inlet kidney grooves 306 formed on the rightward facing surface of the plate as seen in FIGURE 1. The kidney port plate is provided also with an oppositely disposed pair of outlet kidney grooves 308 peripherally disposed between the grooves 306 but with grooves 308 formed on both sides of the plate as seen in FIGURE 12. The kidney grooves 306 and 308 extend peripherally for slightly less than 90° as shown, and the grooves are so placed that they correspond radially with the position of the cylinder ports 276.

The spacer 286 is formed with an annular groove 310 which communicates with the inlet kidney grooves 306 through respective notches 312. The spacer 286 is also provided with a plurality of radial passages 314 which communicate with an annular groove 316 formed about the periphery of the output shaft 28 immediately radially inwardly of the spacer. A plurality of radial passages 318 in the output shaft complete communication between the groove 316 and the pressure chamber 248. Accordingly, the bore 182 in the input shaft 26 communicates at all times with the inlet kidney grooves 306 in the kidney port plate 284. As a result, outlet pressure of the control pump 100 comprises the inlet pressure of the dynamic regulator 78, or, in other words, the control pump 100 and the dynamic regulator 78 are connected in series.

The outlet kidney grooves 308 on opposite sides of the kidney port plate 284 are connected by respective axial passages 320. The outlet kidney grooves on the left face of the kidney port plate as seen in FIGURE 1 are always in communication with a plurality of pressure ports 322 formed axially through the pressure plate member 288 and communicating with the dynamic pressure chamber 290. Accordingly, the dynamic pressure chamber 290 is in constant communication with the outlet kidney grooves 308 of the plate 284.

Under normal conditions when forward torque is being transmitted through the transmission, or, in other words, when the drive shaft is driving the driven shaft, the pin 302 is disposed in the groove 304 of the kidney port plate 284 as shown in FIGURE 11, and the kidney port plate is so located with respect to the cam 280 of the inner race 58 that the cylinder ports 276 communicate with the dynamic pressure chamber 290 as the ball pistons 274 are pressed inwardly on their pumping strokes from top dead center to bottom dead center. Conversely, the cylinder ports 276 whose ball pistons are on the suction stroke moving from bottom dead center to top dead center are connected to the outlet of the control pump 100. Since the output pressure of the control pump 100 is proportional to torque being carried between the input and output shafts, the initial or inlet pressure of the dynamic regulator is always proportional to torque. In addition, the pressure rise through the dynamic regulator is directly proportional to the relative speed between the inner race 58 and the inner race 56, so that the speed differential between these races determines this pressure rise.

The dynamic regulator 78 also permits the transmission to carry reverse torque for engine braking, for example, when a vehicle containing the transmission is coasting down a steep incline with the engine accelerator released. Under such circumstances, reverse torque is transmitted to the inner race 58, moving the pin 302 to the other end of the groove 304 of the kidney port plate 284 as seen in phantom in FIGURE 11. This is because during engine braking the driven shaft 28 overruns the inner race 58. Thus, the kidney port plate is shifted 90° so that the positions of the inlet and outlet kidney ports are reversed with respect to the rises of the cam 280. By reason of this shift of the kidney port plate, the cylinder ports 276 still communicate with the dynamic pressure chamber 290 as the ball pistons 274 are pressed inwardly on their pumping strokes even though the direction of relative motion between the inner race 58 and the cylinder body 260 has been reversed during engine braking. Accordingly, the dynamic regulator works in the same manner during engine braking as it does in regular drive.

OPERATION

In general, the transmission 20 operates in a manner quite similar to the transmissions disclosed in applicant's Serial No. 29,035 referred to above. However, novel features of this transmission provide substantially improved efficiency, speed of response, durability and transmission life.

As indicated earlier, the specific embodiment of the transmission described provides a drive ratio range of zero to 2.5 overdrive. If, for example, the input shaft 26 is rotated at a constant speed of approximately 1,750 r.p.m., the output shaft can be made to rotate at any speed from zero to approximately 4,500 r.p.m. with infiinitely variable ratios in between depending upon the control setting.

The input shaft 26 may be driven from any type of prime mover, for example, an internal combustion engine (not shown). The prime mover may rotate the input shaft at any desired variable or constant speed, although for purposes of economy, it is usually preferable to operate the prime mover at a constant speed corresponding to highest efficiency. The output shaft 28 may be connected either directly or through suitable gearing (not shown) to any mechanism to be driven at varying speeds. For example, the output shaft might be connected for driving the wheels of a vehicle such as an automobile, truck, tractor or the like.

The arrangement of the specific embodiment illustrated is such that rotation of the drive shaft in one direction causes rotation of the driven shaft in the reverse direction at the selected speed ratio. It is contemplated that the arrangement in a vehicle would be such that the vehicle wheels would be driven to propel the vehicle in the forward direction. While no specific mechanism is illustrated for reversing the direction of rotation of the driven shaft in order to drive such a vehicle in reverse, it will be understood that any suitable prior art arrangement may be utilized for achieving reverse drive. For example, reverse drive may be achieved through the internal gearing such as employed in my prior application Serial No. 852,902, referred to above. Alternatively, any suitable external reversing mechanism may be utilized such as standard planetary or counter-shaft gearing (not shown).

The drive ratio through the transmission may be controlled manually through the use of any suitable manual means for adjusting the position of the control ring 122 of the hydraulic control unit 84. As mentioned before, by reason of the balanced valve control, no force is required to change the position of the control ring other than that necessary to overcome the slight friction. Accordingly, speed ratios can be adjusted through the use of a simple dial or other manual device, for example, employing suitable leverage for changing the position of the control ring. Alternatively, speed ratios can be controlled automatically through the use of any suitable automatic control which varies the ratio in accordance with vehicle speed, torque being transmitted or accelerator position, or any combination of these criteria. For example, the automatic speed and/or torque responsive controls disclosed in my prior application, Serial No. 29,035 can be readily employed to control the position of the control ring 122 and, accordingly, control the speed ratio through the transmission.

When the input shaft 26 is rotated with the control set for other than zero drive ratio, the resultant rotation of the outer races 52 and 54 will cause the drive balls 50 to rotate about their axes to rotate the inner races 56 and 58 in the reverse direction to cause concurrent rotation of the driven shaft 28 in accordance with the speed ratio selected. When the control ring 122 of the hydraulic control 84 is moved toward the right to increase the speed ratio, the pressure control port 220 is momentarily opened wider and the relief control port 222 is reduced or closed off. This causes an immediate increase in the pressure in the outer race servo chamber 94 which moves the outer races toward one another forcing the drive balls radially inwardly and pressing the inner race 58 toward the right to increase the speed ratio.

Since the hydraulic control 84 is of the "follow-up" type, movement of the outer race carrying member 86 toward the right moves the hub member 114 also toward the right to immediately reduce the opening of the pressure control port 220 and to increase the opening of the relief control port 222 until equilibrium is again obtained at the newly selected, increased speed ratio.

Movement of the control ring 122 toward the left momentarily reduces or closes off the pressure control opening 220 and increases the relief control opening 222 to reduce the pressure in the outer race servo chamber 94 permitting the force exerted by the inner race 58 to move this inner race toward the inner race 56 to move the drive balls radially outwardly and to commensurately spread the outer races 52 and 54. This, in turn, reduces the relief opening 222 and increases the control pressure opening 220 until equilibrium is again obtained at the newly selected, reduced speed ratio.

It will be noted that the inner race 56 is retained in a fixed axial position with respect to the casing 30, so that the centers of the drive balls are shifted axially with each change in speed ratio. Accordingly, at different speed ratios the drive balls roll on different tracks on the inner and outer races.

In addition, the very slight difference in speed of rotation between the inner races 56 and 58 due to the slight overrunning of the inner race 58 causes the drive balls 50 to rotate very slowly about axes perpendicular to the axis of the transmission, along with the primary rotation of the drive balls about axes parallel to the transmission axis. This means that the tracks of the contact points against the drive balls constantly change. As a result, the entire surface of each ball is utilized for power transmission, thus increasing the life and capacity of the transmission.

The hydraulic-type dynamic drive pressure regulator 78 provides a fundamental advance in the concept of substantially non-slip drive between the torque transmitting members of the frictional drive mechanism 48. This dynamic regulator automatically adjusts the mechanical drive pressures between the balls and races to the minimum required for every drive condition, thus reducing surface fatigue to a small fraction of that encountered when using prior torque loading devices.

Providing a slight inherent overrunning of the inner race 58 with respect to the inner race 56 and increasing the mechanical drive pressure force against the drive balls with increase in the amount of overrunning automatically compensates for changes in the coefficient of friction between the drive balls and the races. This is highly desirable because increase in oil viscosity and increase in speed reduce the coefficient of friction, requiring higher drive pressure in order to prevent slippage. Conversely, reduction in oil viscosity and reduction in speed increase the coefficient of friction, requiring less drive pressure for prevention of slippage. For example, the coefficient of friction reduces approximately 40% when the driven shift speed changes from 1,800 r.p.m. to approximately 4,000 r.p.m.

Previous torque loading devices achieved drive pressures varied in accordance with changes in torque only, thus requiring that the drive pressures always be adequate to prevent slippage under the worst possible high speed and high oil viscosity conditions. In some instances, therefore, the axial load against the drive balls is at least twice what is required to prevent slippage, and under such conditions, the life of the drive balls and races, based on ball bearing experience, is approximately ⅛ of that which could be achieved if the mechanical drive pressures were to be maintained at the minimum required. In other words, ball bearing experience indicates that the life of ball bearings and races varies inversely as the cube of contact pressures.

It will be seen, therefore, that substantial reduction in drive pressures coupled with utilization of the entire ball surface for transmitting torque achieves vast improvement in life expectancy. The resulting transmission life achieved through this invention is comparable to transmissions employing standard gearing, clutches, brakes and the like. This has never before been approached in a mechanical type infinitely variable speed transmission.

Furthermore, the reduction in drive pressures causes a commensurate increase in overall efficiency resulting in efficiencies approaching standard gear transmissions. Accordingly, the transmission of this invention greatly exceeds efficiencies of transmissions utilizing hydrodynamic torque converters or fluid couplings as employed in practically all commercial automatic vehicle transmissions on the market at the present time.

The relatively minute overrunning of the inner race 58 with respect to the inner race 56 results from leakage in the dynamic regulator pump and in the hydraulic passages and chambers. This leakage can be very closely controlled so that the maximum overrunning is in the neighborhood of 2% with normal overrunning being substantially smaller. It will be understood that if there were no leakage, there would be no overrunning at all and the inner race 58 would rotate at exactly the same speed as the inner race 56.

The predetermined leakage in the dynamic regulator 78 results in relative rotation between the cam ring 280 and the cylinder member 260. This causes reciprocation of the ball pistons 274 at a speed depending upon the speed of relative rotation. Thus, increased speed of relative rotation increases the pressure output of the dynamic regulator, increasing the pressure in the dynamic pressure chamber 290. Increase in pressure in the regulator chamber 290 causes an increase in the force exerted tending to move the inner races toward one another. This force, and the resultant mechanical drive pressure between the inner races and the drive balls, is proportional to the regulator pressure which, in turn, is proportional to the relative speed of rotation.

It will be understood that the force urging the inner race 58 toward the inner race 56 is opposed by an equal and opposite reaction force of the inner race 56. Since the inner races are symmetrical, the mechanical drive pressures exerted between the inner races and the drive balls are always equal.

The tendency of the inner race 58 to overrun the inner race 56 depends upon the torque resistance of the driven shaft and the coefficient of friction between the inner races and the drive balls 50. At any given mechanical drive pressure, the coefficient of friction depends primarily upon oil viscosity and surface speed between the inner race and the drive balls. When the oil viscosity increases, the oil film becomes thicker or tougher and the coefficient of friction is reduced. When the surface speed is increased, the coefficient of friction is also reduced. Decreases in viscosity and decreases in speed both tend to increase the coefficient of friction.

Since the coefficient of friction with the drive balls is the same for both inner races but the inner race 58 is hydraulically coupled for slight predetermined rotation with respect to the driven shaft, slight slippage occurs between the drive balls and the fixedly coupled inner race 56. This slight predetermined slippage permits the inner race 58 to overrun the driven shaft to actuate the dynamic regulator 78. The dynamic regulator provides a regulator pressure which determines a drive pressure of the exact magnitude required for the existing coefficient of friction between the inner races and the drive balls.

When the coefficient of friction decreases, the inner race 58 increases its relative overrunning because slightly more slip occurs between the drive balls and the inner race 56. This causes an increase in the relative rotation in the dynamic regulator which increases the regulator pressure and thus increases the drive pressure between the races and the drive balls. This increase in drive pressure causes a decrease in the ratio of the tangential force (between the drive balls and the inner race 58) to the drive pressure, which decreases the slippage. Equilibrium is reached where the overrunning of the inner race 58 achieves a drive pressure exactly balanced with the existing coefficient of friction and tangential force. In every instance, therefore, the dynamic regulator provides the exact drive pressure required for essentially non-slip drive through the transmission but never provides more drive pressure than is necessary.

In order to fully understand the operation of the dynamic regulator 78, it is well to consider the relationship of drive pressure to torque. Inasmuch as the inner race 58 is permitted to overrun slightly with respect to the inner race 56, the inner race 58 will always transmit less than 50% of the total output torque, and, correlatively, the inner race 56 will always carry more than 50% of the total output torque. Because the inner race 58 is hydrostatically coupled to the output shaft 28 by means of the dynamic regulator 78, the hydraulic pressure of the regulator and, accordingly, the drive pressure exerted between the inner races and the drive balls is a result of the torque being transmitted through the inner race 58 only. The drive pressure varies directly in proportion to the torque being transmitted through the inner race 58.

Assume an absolutely positive drive action between the drive balls 50 and the inner race 56. This is theoretical only, of course, since absolutely positive drive could only be achieved by providing small mating teeth on the balls and races, for example. In this theoretical case, the inner race 58 would idle along with the same speed as the race 56 because there would be no torque force tending to cause the race 58 overrun. Accordingly, no regulator hydraulic pressure and no mechanical drive pressure would be produced nor would any be required with positive drive between the drive balls and the inner race 56.

When a very high coefficient of friction exists between the drive balls and the inner races, the torque transmitted by the inner race 58 is relatively small. Only a slight lag of speed between the inner races occurs and the mechanical drive pressure is resultingly low.

As the coefficient of friction decreases, the amount of torque transmitted by the inner race 58 increases. This is because a decrease in coefficient of friction tends to cause an increased overrunning of the inner race 58 with respect to the inner race 56. Since the inner race 58 is coupled hydrostatically to the output shaft through the dynamic regulator 78, the proportion of torque transmitted through this inner race increases with increase in hydraulic pressure in the coupling. At the same time, of course, the increased hydraulic pressure provides an increase in mechanical drive pressure which decreases the tendency to slip an amount exactly equal to that required to achieve drive equilibrium.

Theoretically, an infinitely low coefficient of friction would increase the proportion of torque carried by the inner race 58 to 50% of the total torque. In this theoretical instance, the lag between the inner races would be a maximum and the dynamic regulator 78 would provide the absolute maximum in drive pressure.

The dynamic regulator 78 is also directly responsive to changes in total torque through the transmission. As explained earlier, the inlet pressure of the dynamic regulator is equal to the pump outlet pressure in the pump pressure chamber 106 of the control unit 84. Since the pump outlet pressure varies in proportion to changes in torque, this effect is superimposed on the dynamic regulator. As a result, the dynamic regulator provides a drive pressure between the races and drive balls which varies in accordance with both torque and coefficient of friction.

An additional advantage of providing pump outlet pressure to the dynamic regulator inlet is increased speed of response and prevention of slip upon speed ratio reduction. When the control ring 122 is moved to reduce the ratio, maximum pump pressure is delivered to the dynamic regulator inlet so that the required change in ratio is accomplished expeditiously and positively in spite of the relatively small effective area in the dynamic pressure chamber 290, and there is no danger of instantaneous slip.

It will be understood that the present invention provides a mechanical type infinitely variable speed transmission incorporating a number of improvements which result in overall efficiency and transmission life comparable to a standard manual gear type, or "stick shift," transmission. At the same time the transmission provides all of the advantages of infinitely variable ratio hydrodynamic or fluid coupling automatic transmissions without their low efficiencies. Furthermore, the drive ratio range of this improved transmission is much greater than the ranges of existing transmissions of comparable size and complexity.

Variations and modifications may be effected without departing from the scope of the novel concepts of the present invention.

I claim:

1. In a variable speed drive transmission including a drive shaft and a driven shaft with a ball and race type frictional drive change speed mechanism having drive elements in frictional engagement drivingly interconnecting said shafts, the improvement comprising mechanism automatically controlling drive pressures between said drive elements in accordance with the coefficient of friction between two of said drive elements.

2. In a variable speed drive transmission including a drive shaft and a driven shaft with a ball and race type frictional drive change speed mechanism having drive elements in frictional engagement drivingly interconnecting said shafts, the improvement comprising mechanism automatically varying drive pressures between said drive elements directly in accordance with slippage between two of said drive elements.

3. A variable speed drive transmission according to claim 2 wherein said mechanism additionally varies said drive pressures directly in accordance with torque being carried through the transmission.

4. In a variable speed drive transmission including a drive shaft and a driven shaft with frictional drive change speed mechanism having drive elements in frictional engagement drivingly interconnecting said shafts, the improvement comprising means drivingly operatively coupling one of said drive elements to one of said shafts whereby said coupling means increases drive pressures between said drive elements in response to increase in relative rotational speed between said one drive element and said one shaft, said one drive element being mounted upon said one shaft.

5. A variable speed drive transmission according to claim 4 wherein said means comprises a hydraulic pump with one part coupled to said one drive element and another part coupled to said one shaft for providing a hydraulic pressure varying directly in response to variation in relative rotational speed between said one drive element and said one shaft, and means for increasing drive pressures between said drive elements in response to increase in said hydraulic pressure.

6. In a variable speed drive transmission including a drive shaft and a driven shaft with change speed mechanism drivingly interconnecting said shafts and including a pair of inner races and a pair of outer races with transmission balls in frictional engagement therebetween, the improvement comprising a drive pressure regulator operatively coupling one race of one of said pairs to one of said shafts to increase the force with which said one race is pressed against said transmission balls in accordance with increase in relative speed of rotation between said one race and said one shaft.

7. A variable speed drive transmission according to claim 6 wherein said regulator hydraulically couples said one race to said driven shaft.

8. In a variable speed drive transmission including a drive shaft and a driven shaft with change speed mechanism drivingly interconnecting said shafts and including a pair of inner races and a pair of outer races with transmission balls in frictional engagement therebetween, the improvement comprising hydraulic pressure means to press the races of one of said pairs toward each other with force varying directly as the relative speed between the races of said one pair.

9. A variable speed drive transmission according to claim 8 wherein said means comprises a hydraulic pump having one pump element coupled to one of the races of said one pair and another pump element coupled to the other of said races of said one pair, and a hydraulic servo operatively disposed between said races of said one pair and responsive to hydraulic pressure generated by said pump.

10. A variable speed drive transmission according to claim 9 wherein one of said pump elements encircles the other pump element and said hydraulic pump includes pistons operatively disposed between said pump elements, and actuating portions on one of said pump elements for actuating said pistons and arranged to radially balance the forces exerted on and by said pistons.

11. In a variable speed drive transmission including a drive shaft and a driven shaft with change speed mechanism drivingly interconnecting said shafts and including a pair of inner races and a pair of outer races with transmission balls in frictional engagement therebetween, the improvement comprising means rigidly coupling one race of one of said pairs to one of said shafts, means rotatably supporting the other race of said one pair with respect to said one shaft, a hydraulic pump drivingly coupling said one race to said one shaft, said hydraulic pump providing a hydraulic pressure, and hydraulic servo means responsive to said hydraulic pressure from said pump for pressing said races of said pair toward one another with force varying directly with said hydraulic pressure.

12. In a variable speed drive transmission including a drive shaft and a driven shaft with frictional drive change speed mechanism having drive elements in frictional engagement drivingly interconnecting said shafts, the improvement comprising first hydraulic pressure means varying the drive pressure between said drive elements inversely as the coefficient of friction between the elements, and second hydraulic pressure means varying the drive pressure between said elements directly as the torque being carried through the transmission.

13. In a variable speed drive transmission including a drive shaft and a driven shaft with frictional drive change speed mechanism having drive elements in frictional engagement drivingly interconnecting said shafts, the improvement comprising first pump means providing a first hydraulic pressure varying directly in accordance with torque being carried through the transmission, first servo means responsive to said first hydraulic pressure for varying drive pressures between said drive elements, second pump means providing a second hydraulic pressure varying inversely in accordance with the coefficient of friction between two of said drive elements, and second servo means responsive to said second hydraulic pressure for varying drive pressures between said drive elements.

14. A variable speed drive transmission according to claim 13 including means connecting said first and second pump means in series whereby said first hydraulic pressure is supplied to the inlet of said second pump means.

15. A variable speed drive transmission according to claim 14 wherein said connecting means includes a pressure relief valve having a maximum pressure relief setting substantially higher than the normal range of said first hydraulic pressure.

16. In a variable speed drive transmission including a drive shaft and a driven shaft with frictional drive change speed mechanism having drive elements in frictional engagement drivingly interconnecting said shafts, the improvement comprising a first hydraulic pump associated for being driven by said transmission, a first hydraulic servo operatively associated with said drive elements for varying the drive pressures between the drive elements in accordance with hydraulic pressure supplied to said servo, a variable control valve connected to the outlet of said first pump and supplying a reduced hydraulic pressure to said first servo varying in accordance with torque being carried through the transmission, a pressure relief valve connected to the outlet of said first pump in parallel with said control valve and having a pressure relief setting substantially higher than the normal range of pressure supplied to said first servo, a second pump drivingly coupling one of said drive elements to said driven shaft to supply a hydraulic pressure varying directly in accordance with the relative speed of one drive element with respect to said driven shaft, means connecting the outlet of said first pump with the inlet of said second pump in parallel with said control valve and said pressure relief valve, and a second hydraulic servo responsive to hydraulic pressure supplied by said second pump and operatively associated with said drive elements for varying the drive pressures between said elements in accordance with said hydraulic pressure.

17. In a variable speed drive transmission including a drive shaft and a driven shaft with change speed mechanism drivingly interconnecting said shafts and including a pair of inner races and a pair of outer races with transmission balls in frictional engagement therebetween and with the races of each of said pairs axially displaceably associated for changing the drive ratio through the transmission, the improvement comprising a first hydraulic pump associated for being driven by said transmission, a first hydraulic servo operatively associated with one of said pairs of races for urging the races of said one pair toward one another to change the drive ratio and to vary the drive pressures against said transmission balls in accordance with hydraulic pressure supplied to said servo, a variable control valve connected to the outlet of said first pump and supplying a reduced hydraulic pressure to said first servo varying in accordance with torque being carried through the transmission whereby variation of said control valve changes the drive ratio through said transmission, a pressure relief valve connected to the outlet of said first pump in parallel with said control valve and having a pressure relief setting substantially higher than the normal range of pressure supplied to said first servo, a second pump drivingly coupling one of the races of said other pair to said driven shaft to supply a hydraulic pressure varying directly in accordance with the overrunning of said one race with respect to said driven shaft, means connecting the outlet of said first pump with the inlet of said second pump in parallel with said control valve and said pressure relief valve, and a second hydraulic servo responsive to hydraulic pressure supplied by said second pump and operatively associated with the races of said other pair for varying the drive pressures between the races of said other pair and said transmission balls in accordance with said hydraulic pressure.

18. In a variable speed drive transmission including frictional drive elements and hydraulic mechanism including a hydraulic servo arranged for varying drive pressures between said drive elements in accordance with hydraulic pressure supplied to said servo, a hydraulic pump for supplying hydraulic pressure to said servo comprising a cylinder member having a plurality of equally spaced radially extending cylinders, pistons reciprocably disposed in the respective cylinders, an actuator member including an annular cam circumferentially overlying and engaging said pistons for reciprocating the same, said cam including cam rises so placed to radially balance the forces exerted on and by said pistons, means coupling one of said members for concurrent rotation with one of said drive elements, and means coupling the other of said members to a different part of said transmission to provide relative rotation between the members.

19. In a variable speed drive transmission including a drive shaft and a driven shaft with frictional drive change speed mechanism having drive elements in frictional engagement driving interconnecting said shafts, means for supplying a flow of hydraulic fluid for cooling and lubricating said drive elements comprising a source of hydraulic fluid under pressure, a nozzle member having nozzle orifices of predetermined size for directing fluid flow against the exterior of said drive elements, and a control valve member disposed between said source of hydraulic fluid and said nozzle member for supplying a substantially constant hydraulic pressure in said nozzle member, whereby flow from said nozzle member through said nozzle orifices varies only in accordance with viscosity of said hydraulic fluid.

20. In a variable speed drive transmission including a drive shaft and a driven shaft with change speed mechanism drivingly interconnecting said shafts and including a pair of inner races and a pair of outer races with transmission balls in frictional engagement therebetween, means for providing a flow of hydraulic fluid for cooling and lubricating said races and balls comprising a source of hydraulic fluid under pressure, a nozzle member having a plurality of circumferentially spaced nozzle orifices of predetermined size, means maintaining said orifices in predetermined positions radially inwardly of each of said transmission balls, valve means receiving hydraulic fluid from said source and providing a constant hydraulic pressure in said nozzle member, whereby a substantially constant flow of hydraulic fluid is supplied to each of said transmission balls varying only in accordance with changes in viscosity of said hydraulic fluid, said nozzle member directing said hydraulic fluid against the exterior of said transmission balls.

21. In a variable speed drive transmission including a drive shaft and a driven shaft with a ball and race type frictional drive change speed mechanism having drive elements in frictional engagement drivingly interconnecting said shafts, the improvement comprising a dynamic regulator automatically maintaining drive pressures between said drive elements at the minimum required for substantially positive drive, said dynamic regulator being responsive to the coefficient of friction between drive elements and to torque being carried through the transmission.

References Cited by the Examiner

UNITED STATES PATENTS

| | | | |
|---|---|---|---|
| 1,585,140 | 5/1926 | Erban | 74—208 X |
| 2,696,888 | 12/1954 | Chillson et al. | 74—198 X |
| 2,701,970 | 2/1955 | Kraus | 74—200 |
| 2,878,692 | 3/1959 | Wolf | 74—198 X |
| 2,910,141 | 10/1959 | Almen | 184—6 |
| 2,910,143 | 10/1959 | Almen | 184—6 |
| 3,006,206 | 10/1961 | Kelley et al. | 74—190.5 |

DON A. WAITE, *Primary Examiner.*

BROUGHTON G. DURHAM, *Examiner.*